United States Patent [19]
McGregor

[11] 3,932,003
[45] Jan. 13, 1976

[54] RELEASE DEVICE FOR EMERGENCY BRAKE ACTUATORS

[76] Inventor: Donald T. McGregor, 8067 Monroe Ave., Stanton, Calif. 90680

[22] Filed: Nov. 22, 1974

[21] Appl. No.: 526,239

[52] U.S. Cl. ..................... 303/68; 188/170; 303/13
[51] Int. Cl.² ......................................... B60T 15/02
[58] Field of Search ............. 303/68, 71, 9, 13, 18, 303/89, 89 X; 188/170

[56] References Cited
UNITED STATES PATENTS

| | | | |
|---|---|---|---|
| 3,095,067 | 6/1963 | Murty et al. | 188/170 |
| 3,272,566 | 9/1966 | Clack | 188/170 X |
| 3,285,672 | 11/1966 | Avrea | 303/13 X |
| 3,431,031 | 3/1969 | Ike | 303/13 X |
| 3,650,568 | 3/1972 | Poplawski | 303/13 X |

Primary Examiner—Trygve M. Blix
Assistant Examiner—Douglas C. Butler
Attorney, Agent, or Firm—Lyon & Lyon

[57] ABSTRACT

A release device adapted to be interposed in the air pressure line to an emergency brake actuator of the type which sets its brake by spring action if the pressure in the air pressure line should fail or should fall below a safe pressure; the release device including a main valve movable in response to pressure in the air pressure line to a first position communicating between the air pressure line and the emergency brake actuator; and, in absence of such pressure, is movable to a second position by air pressure from an auxiliary source such as a hand pump or, if needed, air from an available tire, wherein the inlet from the air pressure line is closed and air is supplied from such auxiliary source to the actuator so as to release its brake; the release device further including a bleed valve to insure against any back pressure on the main valve when the air pressure line is functioning.

8 Claims, 6 Drawing Figures

RELEASE DEVICE FOR EMERGENCY BRAKE ACTUATORS

BACKGROUND OF THE INVENTION

Many trucks, trailers and buses which are equipped with air brakes are also equipped with at least a pair of emergency brake actuators which normally hold these respective brakes in their open position by air pressure, such actuators being provided with springs which set their brakes should the air pressure drop below a critical pressure either by a break or leak in the air line or due to malfunction of the compressor. Usually each actuator is provided with a bolt or the like for releasing its emergency brake. This requires one to crawl under the vehicle and engage the bolt with a wrench; first, however, the vehicle must be blocked to prevent movement when the emergency brakes are released.

The brake failure, which has caused the emergency brakes to set, usually occurs on a highway or freeway where the presence of the stalled vehicle usually constitutes a hazard and delay in removing the vehicle increases the hazard. Usually, in order to release the brakes, it is necessary to wait for the arrival of a tow truck operator, thus greatly prolonging the period of time the disabled vehicle remains as a hazard.

SUMMARY OF THE INVENTION

The present invention is directed to a release device for air retained spring setting emergency brake actuators which minimizes the problem of releasing such brakes so that the vehicle which has been stalled by the emergency brakes may be quickly moved. The invention is summarized in the following objects:

First, to provide a release device for emergency brake actuators wherein a small hand pump, or one of the tires of the vehicle may be utilized to release the emergency brakes and which involves minimal time in which to effect release of the emergency brakes.

Second, to provide a release device, as indicated in the preceding object, wherein a novel valve means disposed adjacent to the emergency brake actuator is readily operated to close off the normal air supply line to the emergency brake actuator when air is supplied from an extraneous source, then after such use is automatically reset when control is returned to the main brake system.

Third, to provide a release device, as indicated in the other objects, which may be provided with a readily accessible extension tube, or if the tube is omitted, it merely requires connection while the operator is under the vehicle, brake release being made after the operator has emerged.

Fourth, to provide a release device, as indicated in the other objects, which while primarily intended for use in the event of brake failure, may be used in repair shops or storage areas where the normal brake system is inactivated and it is desired to manipulate the vehicle without reactivating the normal brake system.

DESCRIPTION OF THE PREFERRED EMBODIMENT

Figure 1:
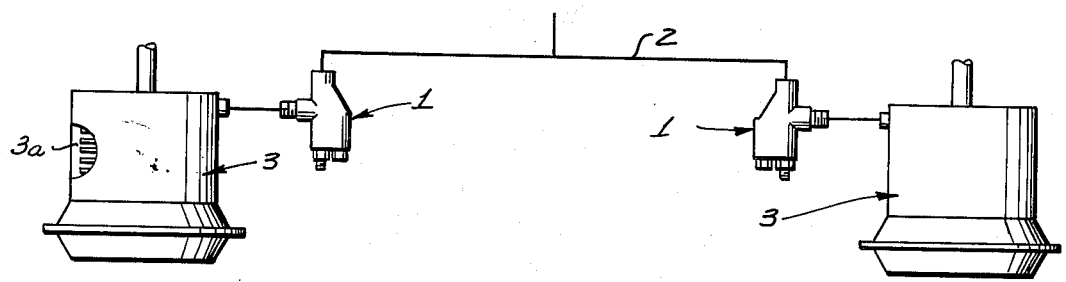
FIG. 1 is a diagrammatical view of a portion of an emergency spring brake system showing a pair of the release device as interposed therein adjacent a pair of the emergency brakes.

The release device designated, generally by 1 is interposed in a conventional air supply line 2 adjacent to an emergency brake actuator 3 containing a brake setting spring 3a. At least a pair of such actuators and their corresponding emergency brakes are provided and it is preferred that a separate release device be used for each emergency brake.

The release device includes a valve body 4 having a primary inlet 5 communicating with a valve bore 6 at the opposite end of which is a secondary inlet 7. Intermediate to the bore is an enlarged chamber 8 connected to a side bore 9 terminating in a outlet 10.

Disposed at one side of the valve bore 6 is a valve socket 11 and inner end of which is connected by the small pressure passage 12 to the primary inlet 5. The valve socket 11 is connected intermediate its ends to the valve bore 6 adjacent to the secondary inlet 7 by a bleed passage 13, the socket is provided with a bleed outlet port 11a.

The bore receives a primary valve member 14 in the form of a piston having spaced seal rings 15 and a stem 16, the end of which is notched as indicated by 16a.

The secondary inlet 7 is internally screwthreaded to receive a fitting 17 which receives a shut-off valve 18. The shut-off valve may be a conventional tire valve. The extended end of the fitting 17 is externally screwthreaded so that an auxiliary air supply line may be connected to the fitting 17.

The valve socket 11 receives a piston 19 having a seal ring 20. The inner end of the piston is provided with one or more notches 21. Extending from the piston 19 is a stem 22 having an enlarged head 23, carrying a seal ring 24 facing toward the piston 19. Surrounding the head 23 is a sleeve 25 having an external seal ring 26 and an internal shoulder forming a valve seat 27 engageable with the seal ring 24. The open end of the socket 11 is screwthreaded to receive a plug 28 which secures the sleeve 25 in place and is provided with a spring 29 bearing against the valve head 23. The sleeve 25 is provided with an external channel 30, communicating with the bleed passage 13 and provided with one or more ports 31.

Operation of the release device is as follows:

The emergency brake actuator 3 is conventional and the spring 3a is connected to the emergency brake actuator in such a manner that the force of the spring functions to set the corresponding emergency brake. When the vehicle is in operation, air pressure from the brake system is supplied to a pneumatic means within the actuator which opposes the spring so that the emergency brake is held in its released condition. Normally, the emergency brakes are independent of the brakes used for control of the vehicle, however, in some cases the type of actuator used for the emergency brake may be used as a vehicle control brake by varying the pressure of the air supplied to the actuator. Thus while this invention is primarily intended for emergency brakes having spring operated brake actuators, is not limited thereto.

Figures 2, 3, 4:
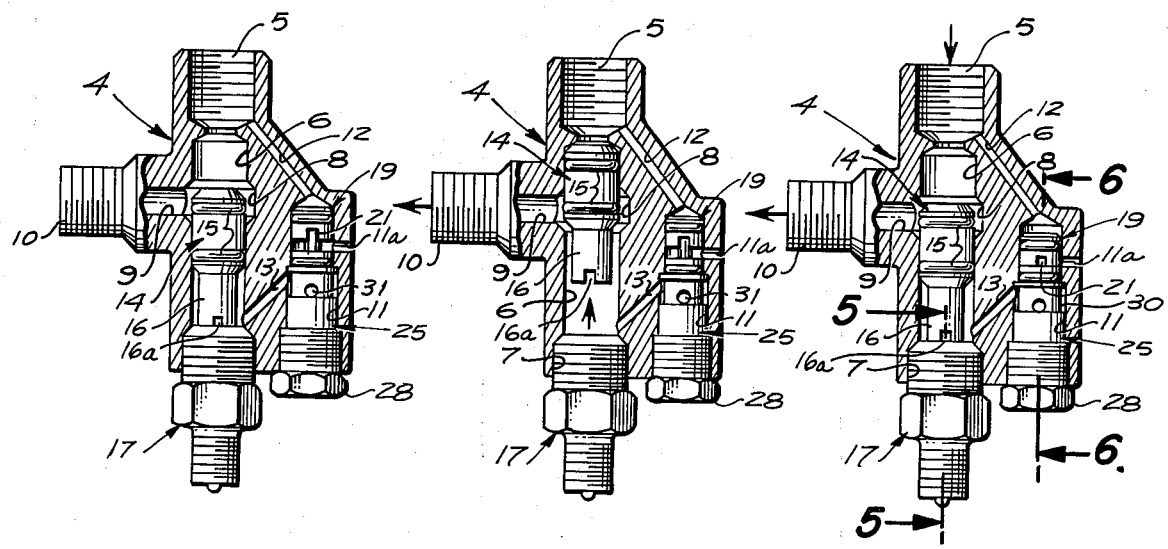
FIG. 2 is a sectional view of the release device with the parts thereof shown in the position occupied when removed from the air line.
FIG. 3 is a similar sectional view showing the parts in the positions when the air line is not functioning and air is supplied from an auxiliary source.
FIG. 4 is a similar sectional view showing the parts in positions assumed when the air line to the emergency brakes is functioning to maintain the emergency brake in its released condition.
Figures 5, 6:
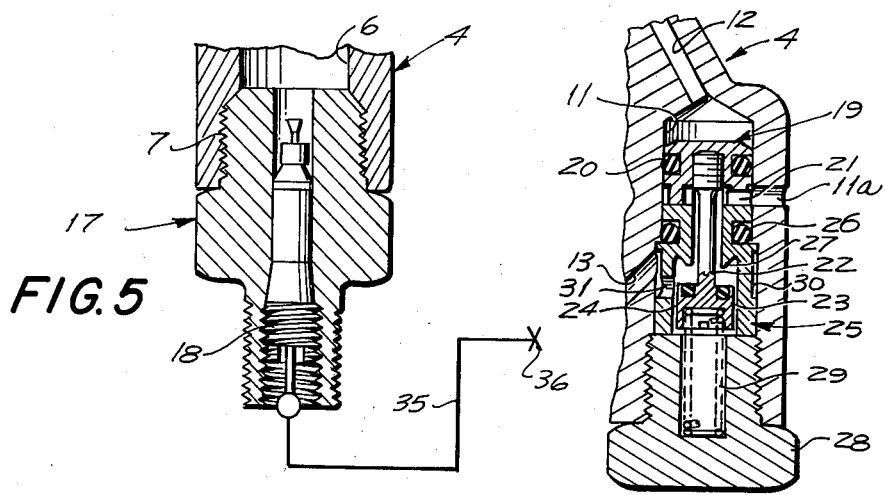
FIG. 5 is an enlarged fragmentary sectional view taken through 5—5 of FIG. 4.
FIG. 6 is an enlarged fragmentary sectional view taken through 6—6 of FIG. 4.

In either case the release device is placed adjacent to the actuator. When the brake system is in operation, the parts of the release device are disposed as shown in FIG. 4, air pressure is supplied through the primary inlet 5 urging the primary valve 14 toward the fitting 17 so that air may pass through the chamber 8 to the outlet 10. Also it will be noted that air under pressure is applied to the bleed valve piston 19 opening communication between the bleed passage 13 and bleed port 11a so that air under pressure cannot accumulate in the region of the secondary inlet 7 but bleeds to atmosphere as indicated in FIG. 6.

Should, for any reason, the pressure in the line drop below a predetermined value, the air will discharge from the actuator through the release device causing the brake actuating spring to set the brake connected with the actuator. In order to release the brake, air pressure is applied to the fitting 17 causing the primary valve member 14 to move to the position shown in FIG. 3 which closes the primary inlet 5 and permits air to pass from the secondary inlet 7 through the chamber 8 to the outlet 10 and the actuator so that the brake is released.

Once pressurized, the auxiliary source of air pressure may be disconnected from the fitting 17. When operation of the brake system is restored the primary valve member 14 is forced back to the position shown in FIG. 4 and any air entrapped between the primary valve member and the fitting 17 is bled through the valve 19 as indicated in FIG. 2.

The auxiliary source of air pressure by which the emergency brake actuator 3 is repressurized may be a simple hand pump and a small diametered hose which may be quickly attached to the fitting 17 so that the air may be supplied from a position outside the vehicle. To avoid the need of moving under the vehicle in order to attach to the fitting 17 a permanent line at 31 may be provided as indicated diagrammatically in FIG. 5 which line may be provided with a second shut-off valve 36 such as a conventional tire valve. As the amount of air required is not substantial, one of the tires of the vehicle may be utilized without substantial depletion of its air. In any case a source of air may be quickly attached so that the period of time in which the vehicle is inactivated because the emergency brakes are set may be readily minimized.

It is common practice in repair shops and in some storage areas to utilize the emergency brakes when the vehicle is sitting idle. In such cases the release device may be used to relieve the emergency brakes to permit pulling the vehicle to another location or otherwise moving the vehicle a short distance without reactivating the air brake system of the vehicle.

Having fully described my invention it is to be understood that I am not to be limited to the details herein set forth, but that my intention is of the full scope of the appended claims.

I claim:

1. A release device for a spring setting emergency brake actuator connected to an air supply line whereby the emergency brake actuator is held in a brake releasing position by air under pressure in the supply line and is urged by its spring to a brake setting position upon predetermined loss in air pressure, said release device utilizing an auxiliary source of air pressure, said release device comprising:
   a. a valve body having a main inlet, and outlet and valve chamber interposed in said air supply line, the valve body also having a second inlet connectable to said auxiliary source of air under pressure;
   b. a valve element movable between a first position providing communication between the main inlet and outlet, and a second position closing the main inlet and providing communication between the second inlet and the outlet;
   c. said valve element having a first pressure responsive surface exposed to pressure in the air supply line for holding the valve element it its first position;
   d. said valve element having a second pressure responsive surface exposed to air pressure from said auxiliary source in the absence of air pressure in the air supply line for holding the valve element in its second position.

2. A release device as defined in claim 1, wherein:
   a. an air pressure operated valve normally closes the second inlet.

3. A release device as defined in claim 2, wherein:
   a. the region between the valve element and second inlet is exposed to atmospheric pressure when the valve element is in its first position.

4. A release device as defined in claim 2, wherein:
   a. the valve body includes a second valve chamber, an entrance passageway between the second valve chamber and an air supply line, a bleed outlet, and a bleed passage from the region between the first valve element and the second inlet through the second valve chamber to the bleed outlet;
   b. a valve plunger is provided in the second valve chamber responsive to pressure in the air supply line to open the bleed passage thereby to relieve any back pressure on the valve element; and
   c. a yieldable means is provided which is operable to close the bleed passage in the absence of air pressure in the air supply line.

5. A release device for an emergency brake actuators which is held in its brake releasing position by air pressure supplied through an air supply line and is urged to a brake setting position by a spring upon loss of air pressure in the air supply line, the release device utilizing an auxiliary source of air pressure, said release device comprising:
   a. valve means interposed in the air supply line including a primary and secondary inlet and an outlet, the valve means including a valve element having a first position responsive to pressure in the air supply line connecting the primary inlet and outlet to provide primary communication between the air supply line and the actuator for moving the actuator to its brake releasing position, and a second position closing the primary inlet and providing a secondary communication between said auxiliary source of air pressure and the outlet said valve element being responsive to pressure at said secondary inlet for maintaining the actuator in its brake releasing position in the absence of adequate pressure in the air supply line;
   b. and a shut-off valve normally closing the secondary inlet on removal of the auxiliary source of air pressure thereby to maintain brake releasing air pressure in the actuator.

6. A release device as defined in claim 5, wherein:
   a. means is provided to bleed the region between the valve means and the shut-off valve when the valve means is in its first position.

7. A release valve as defined in claim 5, wherein: means is provided to bleed the region between the valve means and shut-off valve when the valve means is in its first position, said means comprising:
   a. a bleed passage from said region;
   b. a second valve exposed to the first inlet to occupy an open position in response to pressure at the first inlet;
   c. and yieldable means urging the second valve to close the bleed passage in absence of pressure at the first inlet.

8. A release device for an emergency brake actuator which is held in its brake releasing position by air pressure supplied through an air supply line and is urged to a brake setting position by a spring upon loss of air pressure in the air supply line, the release device utilizing an auxiliary source of air pressure, said release device comprising:
   a. a valve body defining a first and second valve chamber, a first inlet, a second inlet, and a common outlet for the first valve chamber, a pressure passage between the first inlet and second chamber, bleed passage between the second inlet and second chamber, and a bleed outlet from the second chamber;
   b. a first valve movable in the first chamber between a first position providing communication between the first inlet and outlet to supply pressure fluid to the actuator and maintain the actuator in its brake releasing position, while closing communication between the second inlet and outlet, and a second position providing communication between the second inlet and outlet while closing communication between the first inlet and outlet;
   c. a second valve movable in the second chamber between a primary position responsive to pressure at the first inlet to open communication between the bleed passage and bleed outlet and a secondary position in absence of pressure at the first inlet to close the bleed outlet;
   d. and a shut-off valve at the second inlet adapted for connection to said auxiliary source of air pressure, should a drop in air pressure in the supply line occur, to supply air pressure to the actuator and cause the actuator to release the emergencey brake.

* * * * *